US012600129B2

(12) United States Patent
Hayasaka et al.

(10) Patent No.: US 12,600,129 B2
(45) Date of Patent: Apr. 14, 2026

(54) DISCHARGE UNIT, LIQUID DISCHARGE HEAD, AND MANUFACTURING METHOD OF DISCHARGE UNIT

(71) Applicant: CANON KABUSHIKI KAISHA, Tokyo (JP)

(72) Inventors: Takashi Hayasaka, Kanagawa (JP); Shuhei Oya, Kanagawa (JP); Naoki Nakajo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 18/383,738

(22) Filed: Oct. 25, 2023

(65) Prior Publication Data

US 2024/0157700 A1 May 16, 2024

(30) Foreign Application Priority Data

Nov. 10, 2022 (JP) ................................ 2022-180154

(51) Int. Cl.
*B41J 2/14* (2006.01)
*B41J 2/16* (2006.01)

(52) U.S. Cl.
CPC ............ *B41J 2/1433* (2013.01); *B41J 2/162* (2013.01); *B41J 2/1623* (2013.01); *B41J 2002/14491* (2013.01)

(58) Field of Classification Search
CPC ........ B41J 2/1433; B41J 2/162; B41J 2/1623; B41J 2002/14491
See application file for complete search history.

(56) References Cited

U.S. PATENT DOCUMENTS 6,120,131 A * 9/2000 Murthy .................... B41J 2/162 347/47
7,547,094 B2 6/2009 Kawamura et al.
9,085,141 B2 7/2015 Oya et al.
2016/0128175 A1* 5/2016 Kobayashi ............ H05K 1/147 347/50

FOREIGN PATENT DOCUMENTS

JP 2005-319737 A 11/2005

* cited by examiner

*Primary Examiner* — Jason S Uhlenhake
(74) *Attorney, Agent, or Firm* — Venable LLP

(57) ABSTRACT

A discharge unit includes an element substrate having a discharge port which discharges a liquid, an electric wiring substrate having an end surface opposed to the element substrate and a terminal electrically connected to the element substrate, a support member which supports the element substrate and the electric wiring substrate with a support surface, and an adhesive which bonds the electric wiring substrate and the support member. The electric wiring substrate further has a protruding portion which is provided with an interval with respect to the support surface and protrudes from the end surface of the electric wiring substrate toward the element substrate, and the protruding portion is provided at a position overlapping the terminal in a direction parallel to the support surface and orthogonal to a protruding direction of the protruding portion.

10 Claims, 11 Drawing Sheets

DISCHARGE UNIT, LIQUID DISCHARGE HEAD, AND MANUFACTURING METHOD OF DISCHARGE UNIT

BACKGROUND OF THE INVENTION

Field of the Invention

The present invention relates to a discharge unit, a manufacturing method thereof, and a liquid discharge head including the discharge unit.

Description of the Related Art

As a discharge unit of a liquid discharge head used for an inkjet printer or the like, such a configuration having an element substrate in which a discharge port for discharging a liquid is formed and an electric wiring substrate which supplies an electric signal for discharging the liquid to the element substrate is used in general. And in the discharge unit, a connection terminal of the element substrate and a connection terminal of the electric wiring substrate are electrically connected via an electric connecting member such as a wire bonding.

In manufacture of the discharge unit as above, the element substrate and the electric wiring substrate are bonded to a support member by an adhesive and then, the element substrate and the electric wiring substrate are electrically connected. At this time, if the adhesive adheres to the connection terminal of an electric wiring member and the like, bonding by the wire bonding is inhibited. Japanese Patent Application Publication No. 2005-319737 discloses a configuration of a discharge unit in which a spinous projection or a recess part is provided in a lead in order to prevent adhesion of the adhesive on a distal end part of the lead, which is the connection terminal.

SUMMARY OF THE INVENTION

However, in the configuration described above, the adhesive adheres to a part of the connection terminal more or less. Therefore, depending on a connection position between the connection terminal of the electric wiring substrate and the electric connection member, there is no room for providing a part for promoting remaining of the adhesive and thus, the adhesive adheres to the connection terminal, the bonding by the wire bonding is inhibited, and electric reliability of the discharge unit may be lowered.

Thus, an object of the present invention is to provide a discharge unit which prevents adhesion of the adhesive to the connection terminal of the electric wiring substrate and has high electric reliability.

In order to achieve the aforementioned object, a discharge unit of the present invention includes:

- an element substrate having a discharge port for discharging a liquid;
- an electric wiring substrate having an end surface opposed to the element substrate and a terminal electrically connected to the element substrate;
- a support member which supports the element substrate and the electric wiring substrate with a support surface; and
- an adhesive which bonds the electric wiring substrate and the support member, wherein
- the electric wiring substrate further has a protruding portion which protrudes from the end surface of the electric wiring substrate toward the element substrate, the protruding portion being provided by having an interval with respect to the support surface; and
- the protruding portion is provided at a position overlapping the terminal in a direction parallel to the support surface and orthogonal to a protruding direction of the protruding portion.

Moreover, in order to achieve the aforementioned object, a manufacturing method of a discharge unit of the present invention is characterized in that:

- a discharge unit includes:
  - an element substrate having a discharge port for discharging a liquid;
  - an electric wiring substrate having an end surface opposed to the element substrate, a terminal electrically connected to the element substrate, and a protruding portion which protrudes toward the element substrate with respect to the end surface;
  - a support member which supports the element substrate and the electric wiring substrate with a support surface; and
  - an adhesive which bonds the electric wiring substrate and the support member; and
- the manufacturing method of the discharge unit includes:
  - a surface modification process which removes contamination on the terminal of the electric wiring substrate; and
  - a bonding process which bonds the electric wiring substrate to the support member via the adhesive; and
- in the bonding process, a surface facing a direction opposite to the surface on which the terminal of the electric wiring substrate is provided is bonded to the support member such that the protruding portion is disposed with an interval with respect to the support member.

According to the present invention, the discharge unit that prevents adhesion of the adhesive to the connection terminal of the electric wiring substrate and has high electric reliability can be provided.

Further features of the present invention will become apparent from the following description of exemplary embodiments with reference to the attached drawings.

DESCRIPTION OF THE EMBODIMENTS

Figures 1A, 1B:
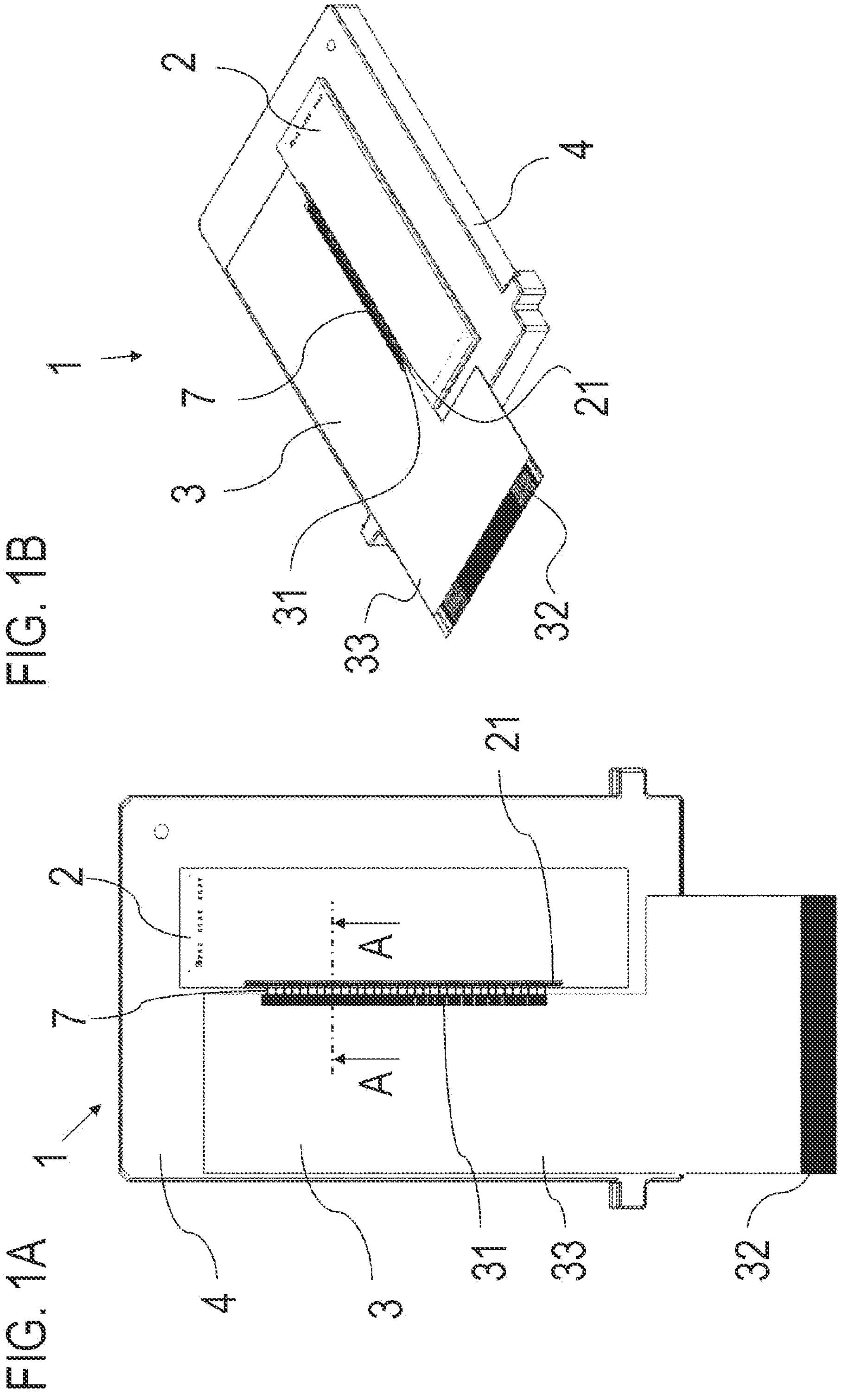
FIGS. 1A and 1B are schematic diagrams of a discharge unit according to Embodiment 1.

The present invention relates to a discharge unit provided on a liquid discharge head which discharges a liquid to a medium for recording and records it and the like. The present invention can be desirably applied to a discharge unit of an inkjet head provided in a thermal inkjet-type inkjet printer which foams a liquid such as ink by thermal energy and discharges it, for example. However, the discharge unit of the present invention is not limited to that but can be applied to discharge units of various liquid discharge heads which discharge liquids by using the thermal energy. Moreover, the present invention can be also applied to the liquid discharge head for which the other various liquid discharge methods including a piezo method using a piezoelectric element as an energy generating element for discharging the liquid are employ ed.

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments are not intended to limit the scope of the invention to the following embodiments. A plurality of features are described in each of the following embodiments, but all of these features are not essential for the invention, and these features may be arbitrarily combined. In the accompanying drawings, an identical or similar composing element is denoted with a same reference numeral, and redundant description may be omitted.

In the following explanation, a case in which the present invention is applied to a discharge unit mounted on an inkjet head will be explained. The inkjet head as the liquid discharge head is constituted by a discharge unit and a container accommodating ink. The discharge unit is connected to an ink accommodating container, and the ink supplied by ink supply means is discharged from an ink discharge port (not shown) of the discharge unit.

Embodiment 1

Configuration of Liquid Discharge Head

FIG. 1A is a plan view illustrating a configuration of a discharge unit 1 of a liquid discharge head according to Embodiment 1 of the present invention and FIG. 1B is a perspective view thereof. The liquid discharge head includes a discharge unit which discharges a liquid and a container which stores the liquid. The discharge unit 1 has an element substrate 2 in which a discharge port for discharging the liquid is formed, an electric wiring substrate 3 which supplies an electric signal for discharging the liquid to the element substrate 2, and a plate 4 for fixing them. The element substrate 2 and the electric wiring substrate 3 are disposed so as to be adjacent to each other on a support surface of the plate 4.

On a surface of the element substrate 2, an electrode terminal portion 21 is provided, and on a surface of the electric wiring substrate 3, an electrode terminal portion 31 and a connection terminal portion 32 are provided. The electrode terminal portion 31 and the connection terminal portion 32 are both provided on a surface of a base member 33 of the electric wiring substrate 3. The electrode terminal portion 21 is located on an end part of the element substrate 2 on a side closer to the electric wiring substrate 3, and similarly, the electrode terminal portion 31 is located on an end part of the electric wiring substrate 3 on a side closer to the element substrate 2. The element substrate 2 and the electric wiring substrate 3 are electrically connected to each other by connection between the electrode terminal portion 21 and the electrode terminal portion 31 to each other via a wire 7. Moreover, the connection terminal portion 32 is provided on an end part different from the end part on which the electrode terminal portion 31 of the electric wiring substrate 3 is provided.

Manufacturing Method of Liquid Discharge Head

Figure 2:
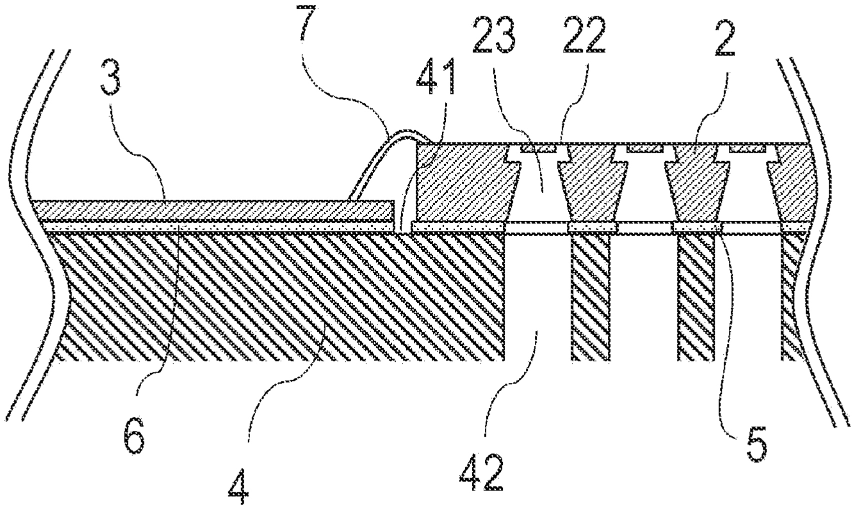
FIG. 2 is a sectional view of the discharge unit according to Embodiment 1.

Subsequently, a manufacturing method of the discharge unit 1 according to Embodiment 1 will be explained. FIG. 2 is an A-A sectional view of FIG. 1A. The plate 4 is a support member having a support surface 41 for fixing the element substrate 2 and the electric wiring substrate 3 via an adhesive or the like. As shown in FIG. 2, the element substrate 2 is bonded to the plate 4 via an adhesive 5, and the electric wiring substrate 3 is bonded to the plate 4 via an adhesive 6. Moreover, the electric wiring substrate 3 is bonded to the plate 4 in a surface modified state in advance. Details of the surface modification of the electric wiring substrate 3 will be described later.

A shape or a material of the plate 4 is not particularly limited as long as it has a size capable of mounting the element substrate 2 and the electric wiring substrate 3, and selection can be made from a wide range such as a resin, ceramic, metal or the like. For the plate 4 in Embodiment 1, it is preferable to use a plate made of alumina having excellent heat resistance since the element substrate 2 and the electric wiring substrate 3 are fixed onto the plate 4 by using a thermosetting adhesive. Moreover, in the plate 4, a channel 42 opened in the support surface 41 and communicating with a liquid supply path 23 of the element substrate 2 is formed.

The element substrate 2 includes a silicon board with a thickness of approximately 0.6 to 0.8 mm, a plurality of electricity-heat converting bodies (not shown) disposed on one surface of the silicon board, and an electric wiring (not shown) electrically connected to each of the electricity-heat converting bodies. Hereinafter, a surface on a side on which the electricity-heat converting body of the silicon board is disposed is referred to as a "front surface".

The electricity-heat converting body converts electricity supplied through the electric wiring to thermal energy and applies this to a liquid such as ink and discharges it. The electric wiring in the element substrate 2 is formed on a silicon board by using a film-forming technology, for example. Moreover, the element substrate 2 includes a plurality of discharge ports 22 corresponding to the electricity-heat converting bodies, a plurality of liquid channels communicating with each of the discharge ports 22, and the liquid supply path 23 for supplying the liquid to the plurality of liquid channels. The liquid supply path 23 is formed by a hole penetrating a front surface (first surface) of the silicon board and a back surface (second surface) on a side opposite to the front surface. The plurality of discharge ports 22 and the plurality of liquid channels are formed on the silicon board by a photolithography technology.

As the electric wiring substrate 3, a flexible board with a thickness of 0.1 to 0.2 mm formed by sandwiching a conductive copper-foil printed wiring by two sheets of an insulating, thin and soft polyimide film and pasting them together can be used. In the two sheets of the polyimide film to be pasted together, by making one of the polyimide films smaller than the other polyimide film and by pasting them together, both end parts of the copper-foil printed wiring are brought into an exposed state. Both end parts of the copper-foil printed wiring function as the connection terminals which electrically connect the electric wiring substrate 3 to the other members, respectively.

The copper-foil printed wirings are disposed by being aligned in plural. One exposed end part of the copper-toil printed wiring constitutes the electrode terminal portion 31 and is connected to the electrode terminal portion 21 of the element substrate 2 via the wire 7 by the wire bonding. In the electrode terminal portion 31, the copper-foil printed wirings are disposed by being aligned in a state having a certain interval, and a terminal row is constituted. On the other hand, the other of the exposed end part of the copper-foil printed wiring constitutes the connection terminal portion 32 to the outside and is used at connection with a device (not shown) for generating an electric signal.

Surface Reforming

Figure 3:
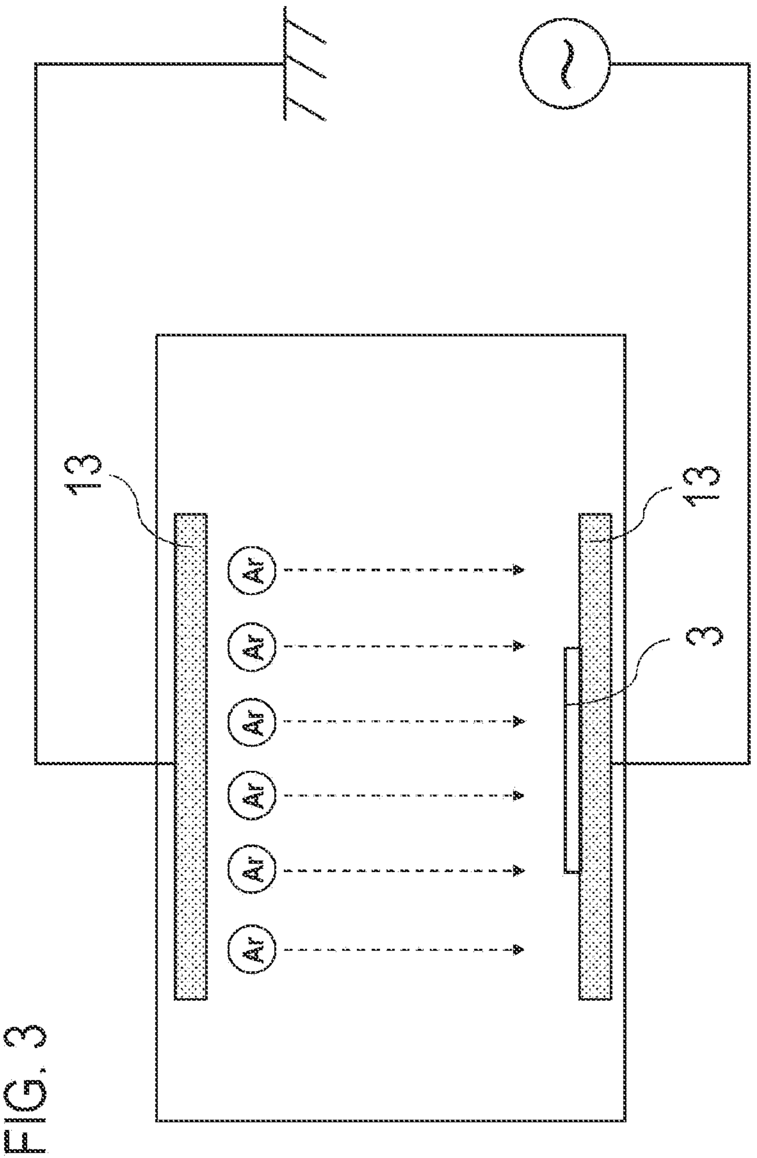
FIG. 3 is an explanatory view of a surface modification method.

Subsequently, a surface modification method of the electric wiring substrate 3 will be explained with reference to FIG. 3. FIG. 3 is a schematic diagram illustrating the surface modification method of the electric wiring substrate 3. In order to remove foreign substances on the surface of the electrode terminal portion 31 of the electric wiring substrate 3, a surface modification process of the electric wiring substrate 3 is performed before a bonding process of bonding the electric wiring substrate 3 to the plate 4.

Since electric wiring components are susceptible to heat, the surface modification of the electric wiring substrate 3 is performed by vacuum plasma processing. The vacuum plasma processing is performed in a state where the electric wiring substrate 3 is disposed between two vacuum plasma electrodes 13. At this time, the electric wiring substrate 3 is disposed in a state where an upper surface and a lower surface of the electric wiring substrate 3 are directed to the vacuum plasma electrodes 13, respectively. And an argon (Ar) gas is ejected from the one vacuum plasma electrode 13 toward the other vacuum plasma electrode 13. By means of the ejected argon gas colliding against the upper surface of the electric wiring substrate 3 (the surface on which the electrode terminal portion 31 is provided), the surface of the electric wiring substrate 3 is modified. On the other hand, since the argon gas does not collide against the lower surface directed to a direction opposite to the upper surface of the electric wiring substrate 3 (adhesion surface with respect to the support surface 41), the surface is not modified. Note that, in application of the present invention, the surface modification method of the electric wiring substrate 3 is not limited to the aforementioned method, but the present invention can be applied also to the configuration in which the surface of the electric wiring substrate 3 is modified by other publicly-known methods.

Electric Wiring Board 93 in Comparative Example

Subsequently, a problem which could occur at bonding between an electric wiring substrate 93 in a comparative example and the plate 4 will be explained. The comparative example has the same configuration as that of Embodiment 1 except a point that a part of the shape of the electric wiring substrate 93 is different. The difference between the comparative example and Embodiment 1 will be described later.

Figure 4A:
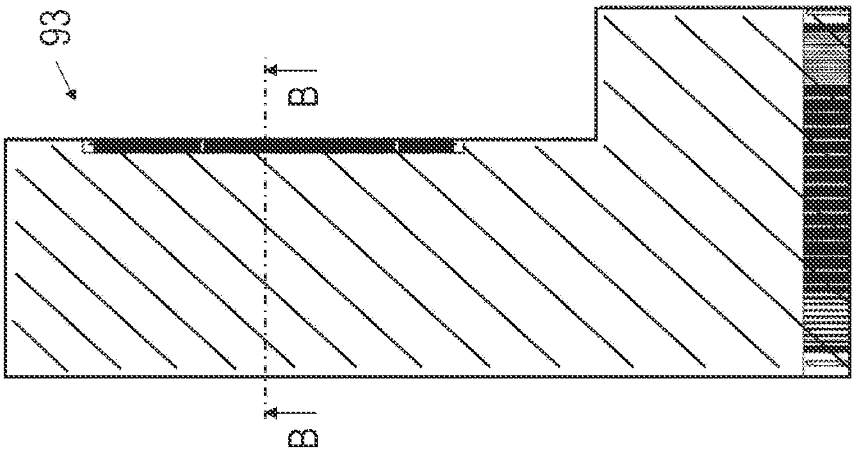
FIGS. 4A and 4B are views illustrating a surface modified state of the discharge unit according to a comparative example.
Figure 4B:
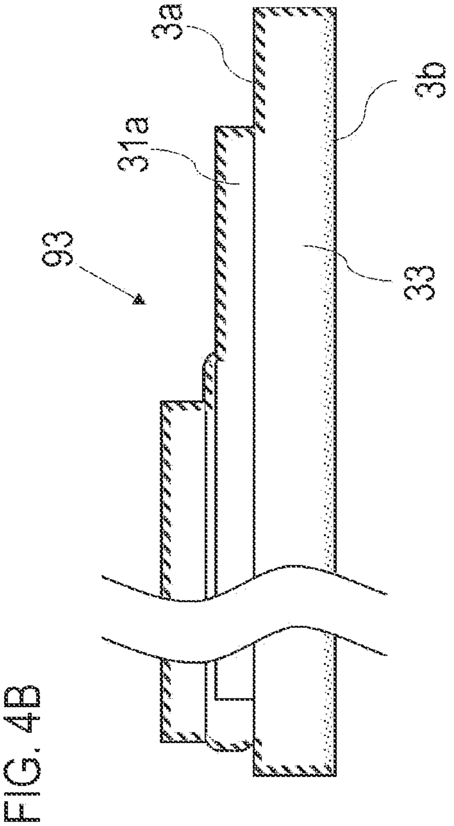

FIG. 4A is a top view illustrating a region subjected to the surface modification in the electric wiring substrate 93 according to the comparative example, and FIG. 4B is a B-B sectional view of FIG. 4A. In FIGS. 4A and 4B, a modified region 3*a* subjected to the surface modification is indicated by diagonal lines, while a non-modified region 3*b* not subjected to the surface modification is indicated by dots. Note that, in FIG. 4B, in order to illustrate the modified region 3*a* and the non-modified region 3*b* easily to be understood, hatching of a member is omitted, and the hatching is also omitted similarly in the following other drawings in some cases.

On an upper surface of the base member 33 of the electric wiring substrate 93, a plurality of leads 31*a*, which are copper-foil printed wirings constituting the electrode terminal portion 31, are provided. Both end parts of the lead 31*a* are disposed in an exposed state on the base member 33 and function as connection terminals. The plurality of leads 31*a* are provided in the vicinity of an end surface of the base member 33, are aligned along the end surface, and extend in a direction orthogonal to the end surface and toward the end surface. Moreover, a lower surface of the base member 33 directed to a side opposite to the upper surface on which the lead 31*a* is provided is a surface to be bonded to the plate 4 via the adhesive 6.

As illustrated in FIGS. 4A and 4B, the modified region 3*a* is formed on the upper surface and the end surface of the electric wiring substrate 93 and the surface of the lead 31*a*. On the other hand, the lower surface of the electric wiring substrate 93 (lower surface of the base member 33) is the non-modified region 3*b* not subjected to the surface modification. The upper surface against which the argon gas collides at the vacuum plasma processing becomes the modified region 3*a* by that action. Moreover, a side surface side also becomes the modified region 3*a* by routing of the argon gas. On the other hand, the lower surface against which the argon gas does not collide and which is bonded to the plate 4 remains the non-modified region 3*b*.

Figure 5A:
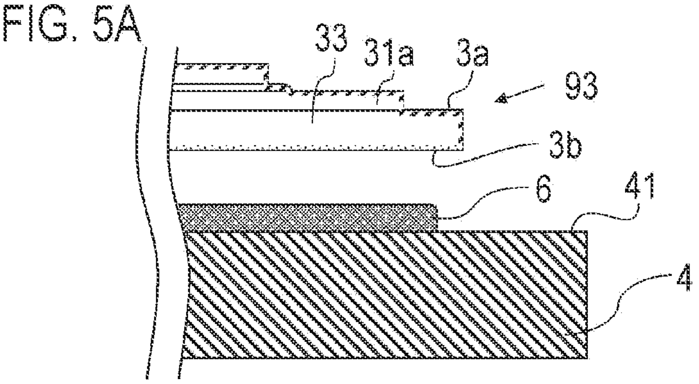
FIGS. 5A to 5C are schematic diagrams illustrating a bonding process of an electric wiring substrate according to the comparative example.

Subsequently, a state where the electric wiring substrate 93 according to the comparative example is bonded to the plate 4 will be explained with reference to FIGS. 5A to 5C. The electric wiring substrate 93 is thermocompression-bonded to the plate 4 while crushing the adhesive 6 and thermally fixed. FIG. 5A is a sectional view illustrating a state immediately before the electric wiring substrate 93 is bonded to the plate 4. On the plate 4, the adhesive 6 is applied or transferred in advance at spots to which the electric wiring substrate 93 is to be bonded. An amount of the adhesive 6 is a sufficient amount to cover the whole lower surface of the electric wiring substrate 93.

Figure 5B:
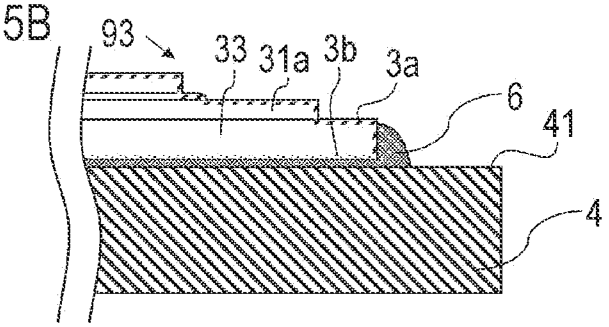

FIG. 5B is a sectional view illustrating a state where the electric wiring substrate 93 begins to contact the adhesive 6 on the plate 4, and the adhesive 6 creeps up the end surface of the electric wiring substrate 93. The modified region 3*a* is in a state with relatively high wettability by the surface modification as compared with the non-modified region 3*b*. When the electric wiring substrate 93 is pushed in toward the plate 4, since the adhesive 6 has not been solidified yet, a part of the adhesive 6 protrudes from a space between the electric wiring substrate 93 and the plate 4. In the comparative example, since the end surface of the electric wiring substrate 93 is the modified region 3*a* and has high wettability, the adhesive 6 protruding from a space between the electric wiring substrate 93 and the plate 4 shows such a behavior of creeping up on the side surface of the electric wiring substrate 93.

Figure 5C:
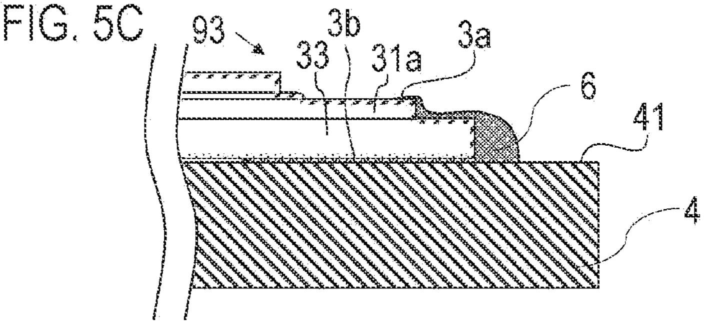

FIG. 5C illustrates a state where the electric wiring substrate 93 is further pushed in toward the plate 4 from the state in FIG. 5B. When the electric wiring substrate 93 is further pushed in, an amount of the adhesive 6 protruding from the space between the electric wiring substrate 93 and the plate 4 increases, and the adhesive 6 adheres not only to the end surface of the electric wiring substrate 93 but also on an upper surface thereof. That is, in the comparative example, the adhesive 6 adheres to the lead 31*a* of the electrode terminal portion 31 of the electric wiring substrate 93. The adhesive 6 which adheres to the surface of the lead 31*a* and is solidified contaminates the lead 31*a* and inhibits bonding between the wire 7 and the lead 31*a* by the wire bonding. As a result, the electric connection between the electric wiring substrate 93 and the element substrate 2 becomes unstable, and the electric reliability of the discharge unit 1 lowers. On the other hand, if an application amount of the adhesive 6 is decreased, there is a concern that the bonding between the electric wiring substrate 93 and the plate 4 becomes unstable. Thus, the inventors of this application conceived a configuration and a manufacturing method of a discharge unit in which the protruding adhesive does not adhere to the connection terminal such as the lead after applying a sufficient amount of the adhesive.

Electric Wiring Board 3 of Embodiment

Figure 6:
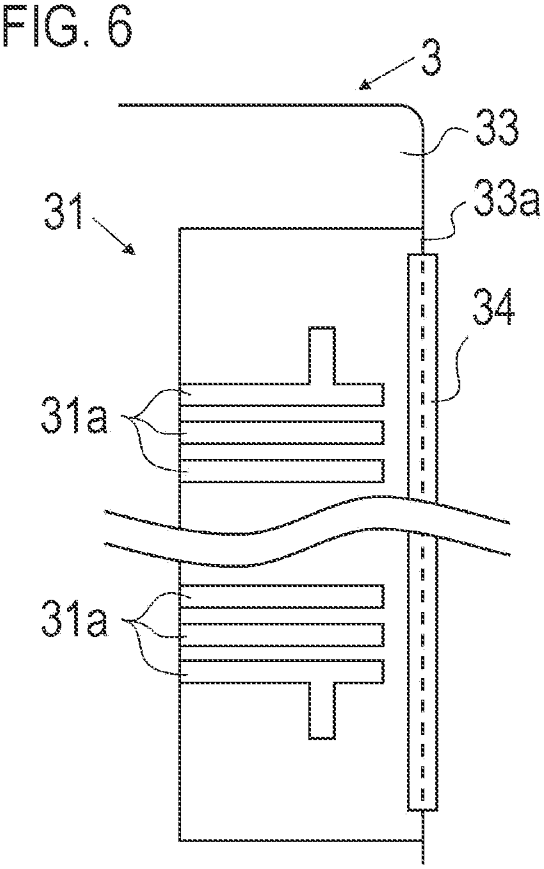
FIG. 6 is a schematic diagram illustrating a configuration of an electric wiring substrate according to Embodiment 1.
Figure 7B:
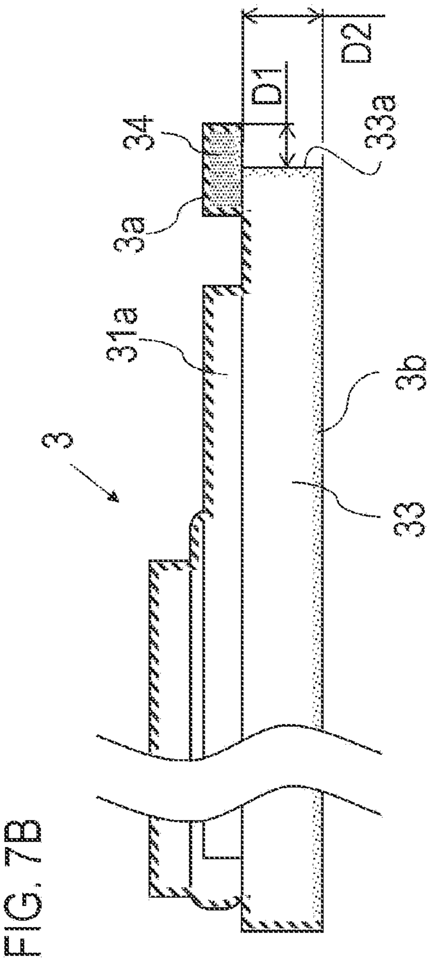
FIGS. 7A and 7B are views illustrating a surface modified state of the discharge unit according to Embodiment 1.
Figure 7A:
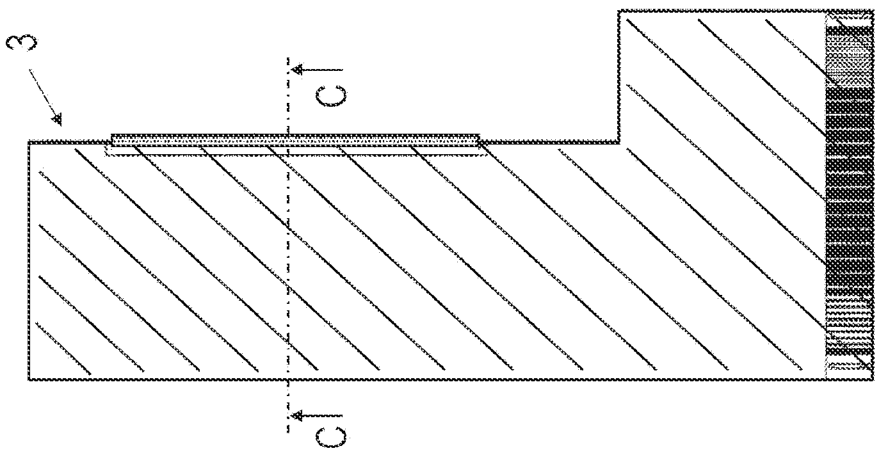

Subsequently, the electric wiring substrate 3 of Embodiment 1 according to the present invention will be explained. FIG. 6 is a top view of the electric wiring substrate 3 according to Embodiment 1. FIG. 7A is a top view illustrating a surface-modified region of the electric wiring substrate 3 according to Embodiment 1, and FIG. 7B is a C-C sectional view of FIG. 7A. The electric wiring substrate 3 of Embodiment 1 is different from the electric wiring substrate 93 of the comparative example 1 in a point where a protruding portion 34 is provided.

Similarly to the comparative example, on the electric wiring substrate 3 of Embodiment 1, a plurality of the leads 31*a*, as connection terminals are provided in the vicinity of an end surface 33*a* of the base member 33. An aligning direction of the plurality of leads 31*a* is a direction parallel to the end surface 33*a*, and an extending direction of each of the leads 31*a* is a direction orthogonal to the end surface 33*a* and going toward the end surface 33*a*. The end surface 33*a* is a surface opposed to the element substrate 2 when the element substrate 2 and the electric wiring substrate 3 are bonded to the plate 4. The end surface 33*a* of the base member 33 is an end surface of the electric wiring substrate 3.

As shown in FIG. 6, on the electric wiring substrate 3 of Embodiment 1, the protruding portion 34 protruding from the end surface 33*a* toward the element substrate 2 is provided. That is, a protruding direction of the protruding portion 34 is orthogonal to the aligning direction of the leads 31*a* and is parallel to the extending direction of the lead 31*a*. In a state where the electric wiring substrate 3 is bonded to the plate 4, the protruding portion 34 is provided with an interval with respect to the support surface 41, and a lower surface of the protruding portion 34 is opposed to the support surface 41. The protruding portion 34 is provided in order to suppress creeping-up of the adhesive 6 when the electric wiring substrate 3 is bonded to the plate 4 and to prevent adhesion of the adhesive 6 to the lead 31*a*.

Moreover, the protruding portion 34 extends from the lead 31*a* on one end in the aligning direction in the plurality of leads 31*a* to the lead 31*a* on the other end on a side opposite to the one end. That is, the protruding portion 34 is provided so as to overlap all the leads 31*a* in the aligning direction of the plurality of leads 31*a*. Here, the overlap between the protruding portion 34 and the lead 31*a* in the aligning direction means that the protruding portion 34 and the lead 31*a* are at the same position in the aligning direction. In other words, when the electric wiring substrate 3 is seen from a direction perpendicular to the upper surface of the electric wiring substrate 3, when the lead 31*a* is extended in the extending direction, it overlaps the protruding portion 34 at the extended end without fail. Moreover, in this embodiment, when seen from the protruding direction of the protruding portion 34, the protruding portion 34 and the lead 31*a* overlap each other.

As shown in FIG. 7B, the protruding portion 34 is provided on the surface of the base member 33 and protrudes with respect to the end surface 33*a* so as to cover an upper part of the end surface 33*a*. In this embodiment, the lead 31*a* and the protruding portion 34 are provided substantially on the identical plane, and a height of the lead 31*a* and a height of the protruding portion 34 are substantially the same. In order to avoid contact by the protruding portion 34 with the wire 7, the height of the protruding portion 34 is preferably equal to or smaller than the height of the lead 31*a*. In other words, in terms of the relationship between the electric wiring substrate 3 and the plate 4, the height of the protruding portion 34 from the support surface 41 is preferably equal to or smaller than the height of the lead 31*a* from the support surface 41.

In order to suppress the creeping-up of the adhesive 6 and to prevent the adhesion of the adhesive 6 to the lead 31*a*, a protruding length D1 of the protruding portion 34 with respect to the end surface 33*a* is preferably long. When the electric wiring substrate 3 is bonded to the plate 4, supposing that a width of the interval between the support surface 41 and the protruding portion 34 in a direction perpendicular to the support surface 41 is D2, it is preferable that $D1 \geq D2/2$ is satisfied. As described above, by setting the protruding length D1 to a length of a half or more of the width D2 of the interval between the support surface 41 and the protruding portion 34, an effect of preventing adhesion of the adhesive to the lead 31*a* is preferably exerted. In this embodiment, the width D2 of the interval is equal to a thickness of the base member 33. A mechanism by which the adhesion of the adhesive to the lead 31*a* is prevented by the protruding portion 34 will be described later in detail.

In FIGS. 7A and 7B, the modified region 3*a* to which the surface modification is applied is shown by being covered with diagonal lines, and the non-modified region 3*b* to which the surface modification is not applied is shown by being covered with dots. As shown in FIGS. 7A and 7B, in surfaces of the electric wiring substrate 3, the upper surface is the modified region 3*a*, and the lower surface is the non-modified region 3*b*. Moreover, in the protruding portion 34, the upper surface and the side surface are the modified region 3*a*, and the lower surface is the non-modified region 3*b*. Furthermore, in the end surface 33*a* of the electric wiring substrate 3, a part located immediately below the protruding portion 34 is the non-modified region 3*b*.

Figure 8:
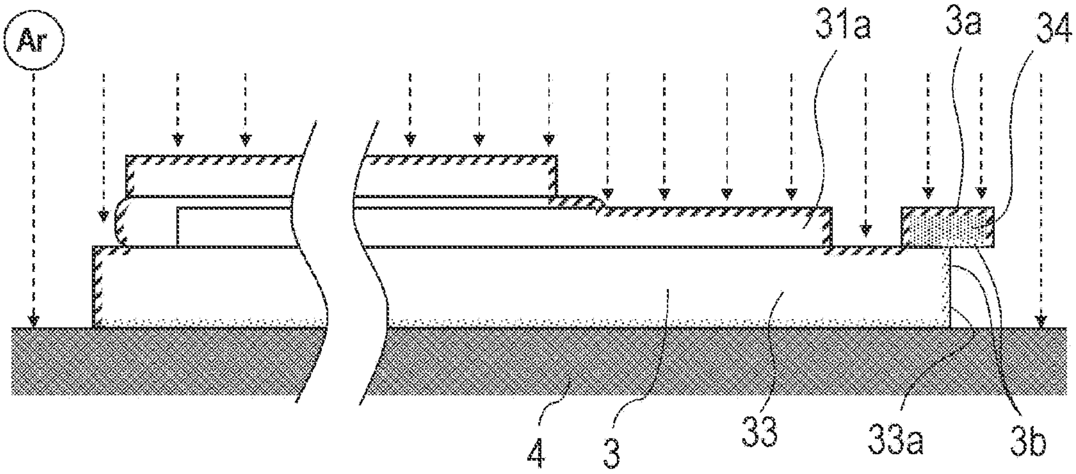
FIG. 8 is a diagram illustrating a state of the surface modification of the discharge unit according to Embodiment 1.

FIG. 8 is a sectional view illustrating a state where the electric wiring substrate 3 is subjected to the surface modification. As indicated by an arrow in FIG. 8, the argon gas is ejected toward the upper surface of the electric wiring substrate 3. As described above, since the argon gas collides against the electric wiring substrate 3 and goes around, the upper surface and a part of the side surface of the electric wiring substrate 3 are modified to the modified region 3*a*. On the other hand, the lower surface of the protruding portion 34 of the electric wiring substrate 3 and the part located immediately below the protruding portion 34 of the end surface 33*a* are not modified but remain as the non-modified region 3*b*. That is, by providing a structure protruding as the protruding portion 34, the argon gas does not go around to the end surface 33*a*, but the surface modification of the end surface 33*a* is suppressed, whereby the creeping-up of the adhesive 6 on the end surface 33*a* is suppressed.

Figure 9A:
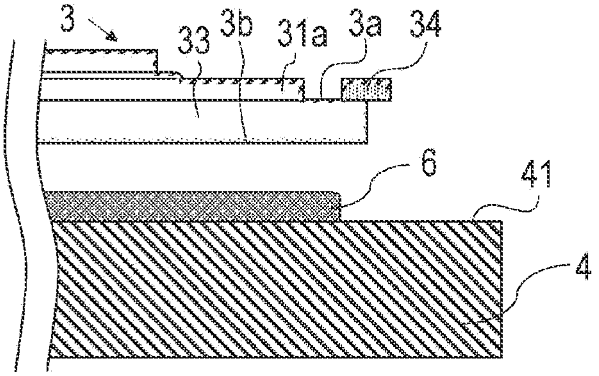
FIGS. 9A to 9C are schematic diagrams illustrating the bonding process of the electric wiring substrate according to Embodiment 1.

Subsequently, a state where the electric wiring substrate 3 according to Embodiment 1 is bonded to the plate 4 will be explained with reference to FIGS. 9A to 9C. The electric wiring substrate 3 is thermocompression-bonded to the plate 4 and thermally fixed while crushing the adhesive 6. FIG. 9A is a sectional view illustrating a state immediately before the electric wiring substrate 3 is bonded to the plate 4. On the plate 4, the adhesive 6 is applied or transferred in advance to spots to which the electric wiring substrate 3 is to be bonded. The amount of the adhesive 6 is a sufficient amount to cover the whole lower surface of the electric wiring substrate 3.

Figure 9B:
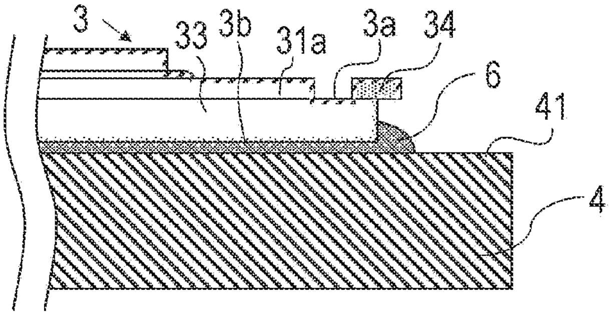

FIG. 9B illustrates a state where the electric wiring substrate 3 begins to contact the adhesive 6 on the plate 4, and the adhesive 6 protrudes from the space between the plate 4 and the electric wiring substrate 3. Since the end surface 33*a* is the non-modified region 3*b*, it is in a state with low wettability as compared with the modified region 3*a*. Therefore, in the electric wiring substrate 3 in this embodiment, as compared with the electric wiring substrate 93 of the comparative example, it is difficult for the adhesive 6 to creep up the end surface 33*a*. That is, when the same amount of the adhesive 6 protrudes, a height of the adhesive 6 in the vicinity of the end surface 33*a* is lower in this embodiment as compared with that in the comparative example.

Figure 9C:
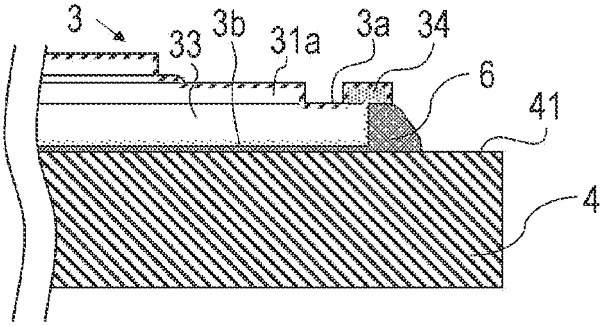

FIG. 9C illustrates a state where the electric wiring substrate 3 is further pushed in toward the plate 4 from the state in FIG. 9B. When the electric wiring substrate 3 is further pushed in, an amount of the adhesive 6 protruding from the space between the electric wiring substrate 3 and the plate 4 increases. However, in Embodiment 1, even if the height of the adhesive 6 increases, the adhesive 6 adheres to the lower surface (surface opposed to the support surface 41) of the protruding portion 34, and movement of the adhesive 6 in an upper direction is regulated. That is, the protruding portion 34 becomes an obstacle and prevents the creeping-up of the adhesive 6 onto the upper surface of the electric wiring substrate 3.

As described above, in the configuration of Embodiment 1, since the end surface 33*a* of the end part on which the lead 31*a* is located is prevented from being modified, the adhesive 6 becomes hard to creep up the end surface 33*a*. Moreover, the movement of the adhesive 6 in the upper direction is physically regulated by the protruding portion 34. Therefore, according to the configuration of Embodiment 1, the adhesive 6 can be prevented from creeping up to the upper surface of the electric wiring substrate 3 and adhering to the lead 31*a* at the adhesion to the electric wiring substrate 3. Thus, the wire 7 is appropriately bonded to the electric wiring substrate 3 by the wire bonding, and lowering of the electric reliability of the discharge unit 1 can be prevented. Particularly, when it is configured such that the protruding length D1 of the protruding portion 34 with respect to the end surface 33*a* and the thickness D2 of the base member 33 of the electric wiring substrate 3 satisfy the relationship of D1≥D2/2, the adhesion prevention effect of the adhesive 6 to the lead 31*a* is preferably obtained.

Embodiment 2

Subsequently, Embodiment 2 according to the present invention will be explained. Embodiment 2 is different from Embodiment 1 in a shape of the protruding portion of the electric wiring substrate 3. Hereinafter, in the explanation of Embodiment 2, the same signs are given to the configurations similar to those in Embodiment 1, the explanation will be omitted, and only featured configurations of Embodiment 2 will be explained.

Figure 10B:
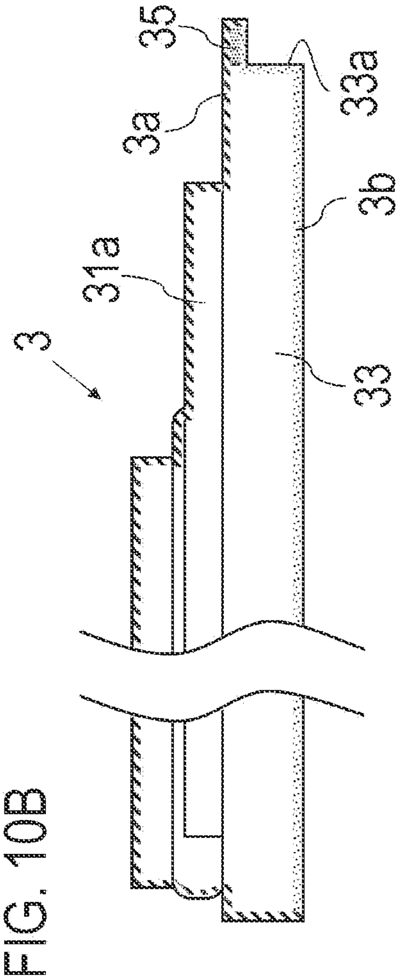
FIGS. 10A and 10B are schematic diagrams illustrating a configuration of an electric wiring substrate according to Embodiment 2.
Figure 10A:
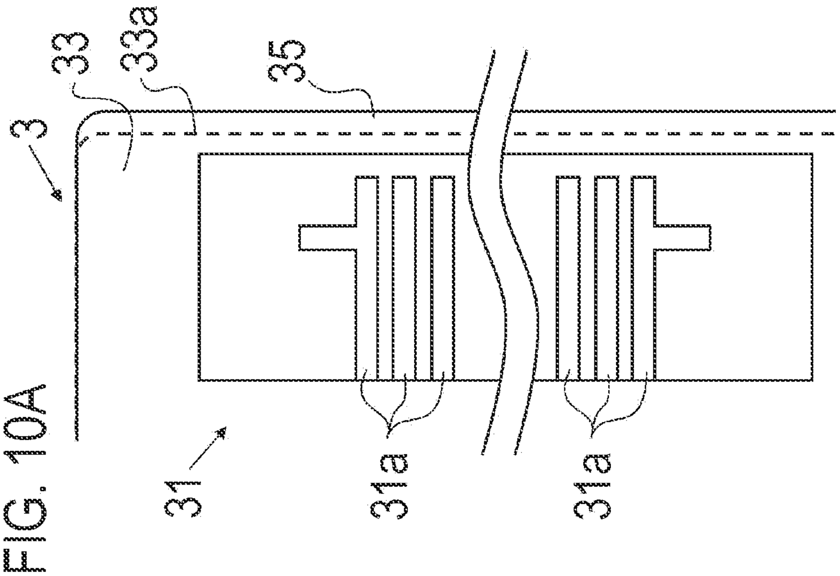

FIG. 10A is a top view of the electric wiring substrate 3 according to Embodiment 2. FIG. 10B is a sectional view illustrating a surface-modified region of the electric wiring substrate 3 according to Embodiment 2. In FIG. 10B, the modified recon 3*a* subjected to the surface modification is indicated by diagonal lines, while the non-modified region 3*b* not subjected to the surface modification is indicated by dots. A protruding portion 35 in Embodiment 2 is similar to the protruding portion 34 in Embodiment 1 in a point that it protrudes in a direction orthogonal to the aligning direction of the leads 31*a* toward the element substrate 2 with respect to the end surface 33*a*. The protruding portion 35 is provided at a position overlapping all the leads 31*a* in the aligning direction of the plurality of leads 31*a*. In other words, when the electric wiring substrate 3 is seen from the direction perpendicular to the upper surface of the electric wiring substrate 3, when the lead 31*a* is extended in the extending direction, it overlaps the protruding portion 35 at the extended end without fail.

Moreover, in Embodiment 2, the upper surface of the protruding portion 35 is configured so as to be a substantially identical plane as the upper surface of the base member 33. By having such a configuration, as compared with Embodiment 1, the lead 31*a* can be disposed closer to the end surface 33*a*. That is because a space for providing the protruding portion on the upper surface of the base member 33 is not needed. That is, the configuration of Embodiment 2 is particularly effective when the lead 31*a* is to be disposed closer to the element substrate 2.

In the configuration as above, too, the part located immediately below the protruding portion 35 of the end surface 33*a* remains as the non-modified region 3*b*, even if the surface modification is performed. Therefore, as compared with the comparative example, in the configuration according to Embodiment 2, the adhesive 6 is hard to creep up the end surface 33*a*. Moreover, the protruding portion 35 becomes an obstacle and prevents the adhesive 6 from creeping up to the upper surface of the electric wiring substrate 3. That is, according to the configuration of Embodiment 2, the adhesive 6 is prevented from creeping up to the upper surface of the electric wiring substrate 3 and adhering to the lead 31*a* at the adhesion of the electric wiring substrate 3. As a result, the wire 7 is appropriately bonded to the electric wiring substrate 3 by the wire bonding, and lowering of the electric reliability of the discharge unit 1 can be prevented.

Moreover, in the configuration of Embodiment 2, too, the modification of the end surface 33*a* located immediately below the protruding portion 35 is suppressed in the surface modification process and thus, the creeping-up of the adhesive 6 is suppressed, and the protruding portion 35 functions as an obstacle which regulates movement of the adhesive 6 in the upper direction. As a result, according to the configuration of Embodiment 2, adhesion of the adhesive 6 to the upper surface of the electric wiring substrate 3 can be prevented.

Embodiment 3

Subsequently, Embodiment 3 according to the present invention will be explained. Embodiment 3 is different from Embodiment 1 in a shape of the protruding portion of the electric wiring substrate 3. Hereinafter, in the explanation of Embodiment 3, the same signs are given to the configurations similar to those in Embodiment 1, the explanation will be omitted, and only featured configurations of Embodiment 3 will be explained.

Figure 11B:
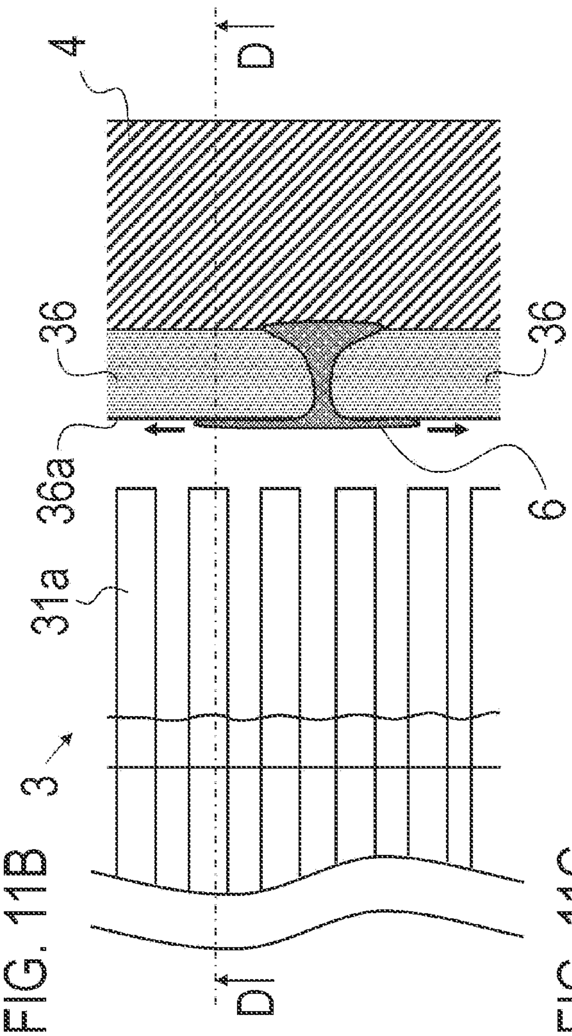
FIGS. 11A to 11C are schematic diagrams illustrating a configuration of an electric wiring substrate according to Embodiment 3.
Figure 11C:
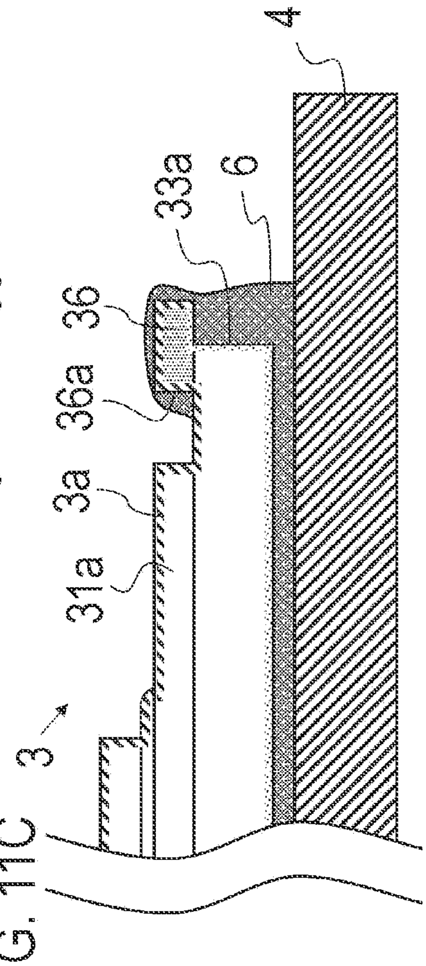
Figure 11A:
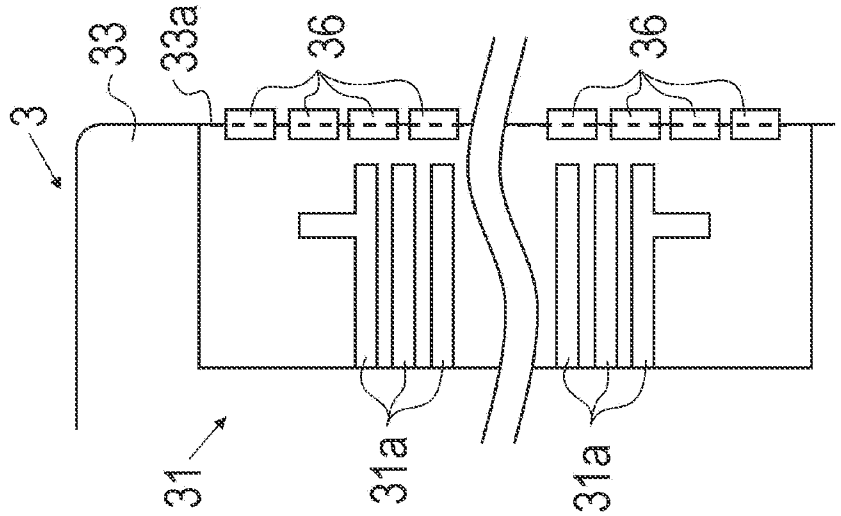

FIG. 11A is a top view of the electric wiring substrate 3 according to Embodiment 3. FIG. 11B is a top view illustrating a vicinity of a protruding portion 36 of the electric wiring substrate 3 according to Embodiment 3 in an enlarged manner. FIG. 11C is a D-D sectional view of FIG. 11B and a sectional view illustrating a surface-modified region of the electric wiring substrate 3 according to Embodiment 3. In FIGS. 11B and 11C, the modified region 3*a* subjected to the surface modification is indicated by the diagonal lines, while the non-modified region 3*b* not subjected to the surface modification is indicated by dots.

In Embodiment 3, a plurality of the protruding portions 36 are intermittently provided in the aligning direction of the leads 31*a*. That is, the plurality of protruding portions 36 are aligned in a direction parallel to the aligning direction of the leads 31*a*, and an interval is provided between each of the protruding portions 36. At least one or more protruding portions 36 are provided in the aligning direction of the plurality of leads 31*a* at positions overlapping one or more leads 31*a*. In other words, when the electric wiring substrate 3 is seen from a direction perpendicular to the upper surface, by extending the lead 31*a* in the extending direction, it overlaps the protruding portion 36 at the extended end without fail.

In the configuration as above, too, the part located immediately below the protruding portion 36 of the end surface 33*a* remains as the non-modified region 3*b* even if the surface modification is performed. Therefore, as compared with the comparative example, in the configuration according to Embodiment 3, the adhesive 6 is hard to creep up the end surface 33*a*.

Moreover, in the configuration according to Embodiment 3, there is a possibility that the adhesive 6 creeps up to the upper surface of the electric wiring substrate 3 through the interval between the plurality of protruding portions 36. However, as shown in FIG. 11B, the adhesive 6 leaking out of the interval of the protruding portion 36 flows in an arrow direction in the figure along a ridge line of the end surface 36*a* facing the lead 31*a* of the protruding portion 36 due to a so-called capillary phenomenon. The end surface 36*a* of the protruding portion 36 is a surface facing a direction opposite to the end surface 33*a* of the base member 33. Therefore, as compared with the comparative example, in the configuration according to Embodiment 3, even if the adhesive 6 creeps up to the upper surface of the electric wiring substrate 3, the adhesive 6 is hard to reach the lead 31*a*. The larger the width in the aligning direction of the protruding portion 36 is, the harder the adhesive 6 flows toward the lead 31*a* by the protruding portion 36, and a remaining effect of the adhesive 6 by the end surface 36*a* of the protruding portion 36 becomes more marked.

As described above, according to the configuration of Embodiment 3, at the adhesion of the electric wiring substrate 3, adhesion of the adhesive 6 to the lead 31*a* can be prevented. As a result, the wire 7 is appropriately bonded to the electric wiring substrate 3 by the wire bonding, and lowering of the electric reliability of the discharge unit 1 can be prevented. That is, even in the configuration in which, in the aligning direction of the leads 31*a*, the protruding portion does not extend from the lead 31*a* on one end to the lead 31*a* on the other end opposite to the one end, the adhesion prevention effect of the adhesive 6 to the lead 31*a* can be obtained. It is to be noted that the width of the aligning direction and the aligning interval of the protruding portion 36 can be changed as appropriate depending on the aligning interval or the disposed position of the lead 31*a*.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-180154, filed on Nov. 10, 2022, which is hereby incorporated by reference herein in its entirety,

What is claimed is:

1. A discharge unit comprising:

an element substrate having a discharge port which discharges a liquid;

an electric wiring substrate having an end surface opposed to the element substrate and a terminal electrically connected to the element substrate;

a support member which supports the element substrate and the electric wiring substrate with a support surface; and an adhesive which bonds the electric wiring substrate and the support member, wherein the electric wiring substrate further has a protruding portion which protrudes from the end surface of the electric wiring substrate toward the element substrate, the protruding portion being provided with an interval with respect to the support surface;

the protruding portion is provided at a position overlapping the terminal in a direction parallel to the support surface and orthogonal to a protruding direction of the protruding portion; and a height of the protruding portion from the support surface is equal to or shorter than that of the terminal from the support surface.

2. The discharge unit according to claim 1, wherein a surface of the terminal and a surface of the electric wiring substrate on a side on which the terminal of the electric wiring substrate is provided are modified regions subjected to surface modification; and an opposed surface opposed to the support surface of the protruding portion and a part located immediately below the opposed surface in the end surface are non-modified regions not subjected to the surface modification.

3. The discharge unit according to claim 2, wherein the adhesive protruding from a space between the electric wiring substrate and the support member adheres to the opposed surface.

4. The discharge unit according to claim 1, wherein the electric wiring substrate has a plurality of the terminals aligned in a direction orthogonal to the protruding direction; and the protruding portion overlaps all the terminals in a direction parallel to the support surface and orthogonal to the protruding direction.

5. The discharge unit according to claim 1, wherein the protruding portions are provided in plural intermittently in a direction orthogonal to the protruding direction.

6. The discharge unit according to claim 1, wherein a protruding length of the protruding portion with respect to the end surface is a length of a half or more of a width of an interval from the support surface to the protruding portion in a direction perpendicular to the support surface.

7. The discharge unit according to claim 1, wherein the electric wiring substrate has a base member which supports the terminal, the base member being bonded to the support member via the adhesive; and the end surface is a surface of the base member.

8. The discharge unit according to claim 1, wherein the adhesive protruding from a space between the electric wiring substrate and the support member adheres to the end surface of the electric wiring substrate.

9. A liquid discharge head comprising:

a discharge unit; and a container which stores a liquid to be supplied to the discharge unit, wherein the discharge unit includes:

an element substrate having a discharge port which discharges a liquid;

an electric wiring substrate having an end surface opposed to the element substrate and a terminal electrically connected to the element substrate;

a support member which supports the element substrate and the electric wiring substrate with a support surface; and an adhesive which bonds the electric wiring substrate and the support member;

the electric wiring substrate further has a protruding portion which protrudes from the end surface of the electric wiring substrate toward the element substrate, the protruding portion being provided with an interval with respect to the support surface;

the protruding portion is provided at a position overlapping the terminal in a direction parallel to the support surface and orthogonal to a protruding direction of the protruding portion; and a height of the protruding portion from the support surface is equal to or shorter than that of the terminal from the support surface.

10. A discharge unit comprising:

an element substrate having a discharge port which discharges a liquid;

an electric wiring substrate having an end surface opposed to the element substrate and a terminal electrically connected to the element substrate;

a support member which supports the element substrate and the electric wiring substrate with a support surface; and an adhesive which bonds the electric wiring substrate and the support member, wherein the electric wiring substrate further has plural protruding portions which protrude from the end surface of the electric wiring substrate toward the element substrate, the protruding portions being provided with an interval with respect to the support surface;

the protruding portions are provided at a position overlapping the terminal in a direction parallel to the support surface and orthogonal to a protruding direction of the protruding portions; and the plural protruding portions are provided intermittently in a direction orthogonal to the protruding direction.

* * * * *